Sept. 2, 1941. W. R. GRISWOLD 2,254,282
MOTOR VEHICLE
Filed Nov. 12, 1938 4 Sheets-Sheet 1
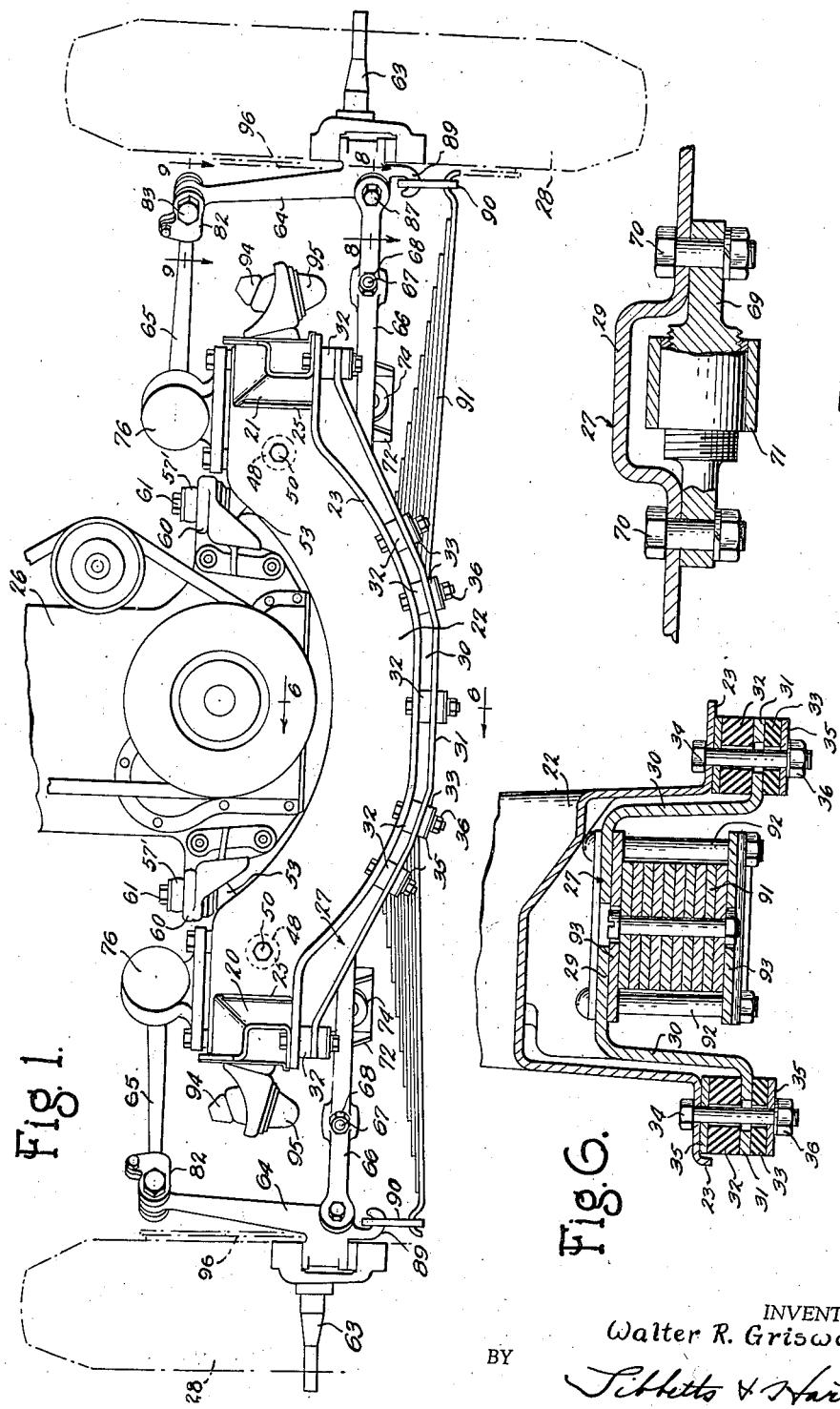
INVENTOR.
Walter R. Griswold
BY
Tibbetts & Hart
ATTORNEYS Sept. 2, 1941.  W. R. GRISWOLD  2,254,282
MOTOR VEHICLE
Filed Nov. 12, 1938  4 Sheets-Sheet 2
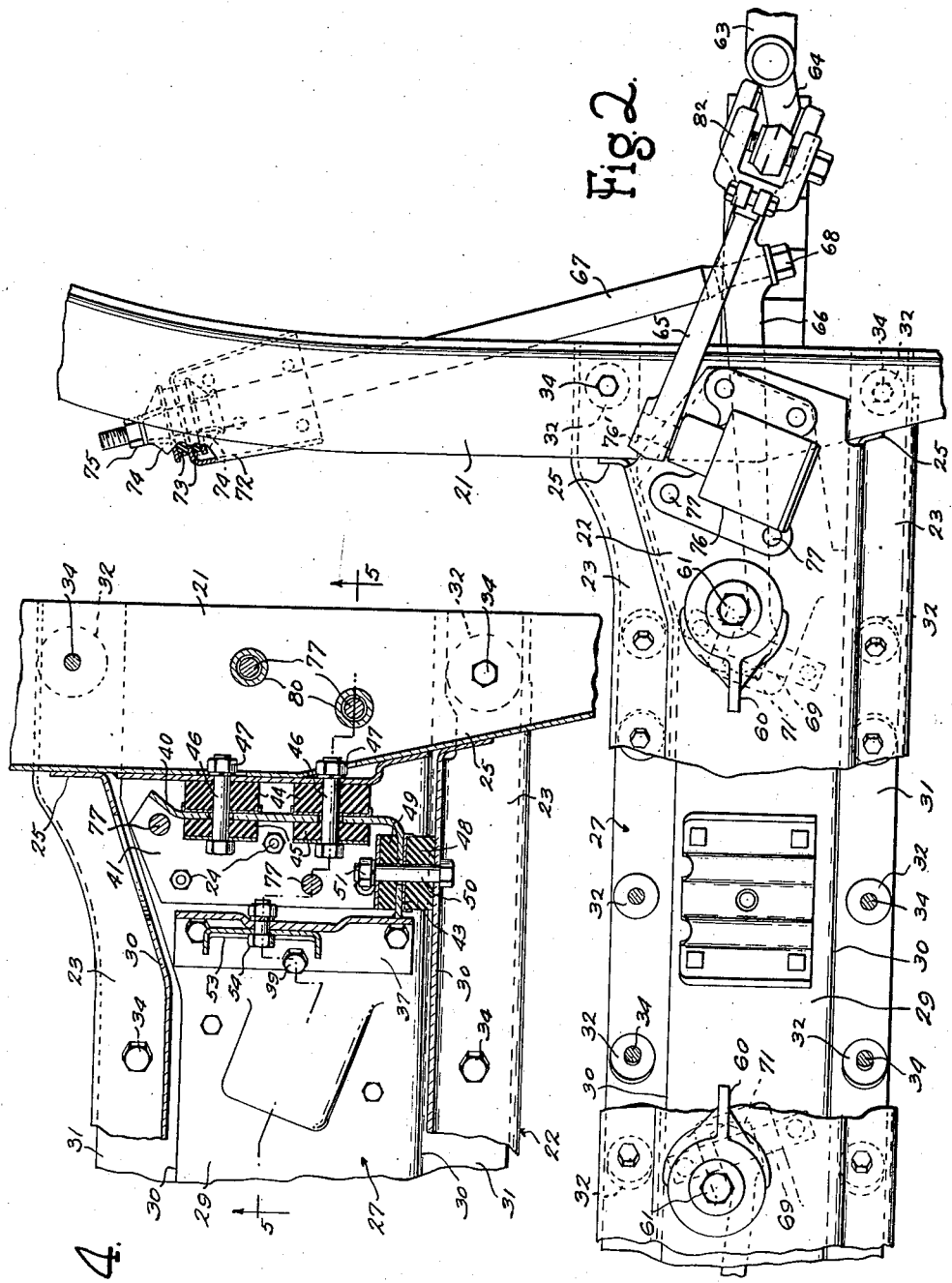
INVENTOR.
Walter R. Griswold
BY
Stetto & Hart
ATTORNEYS Sept. 2, 1941. W. R. GRISWOLD 2,254,282
MOTOR VEHICLE
Filed Nov. 12, 1938 4 Sheets-Sheet 3
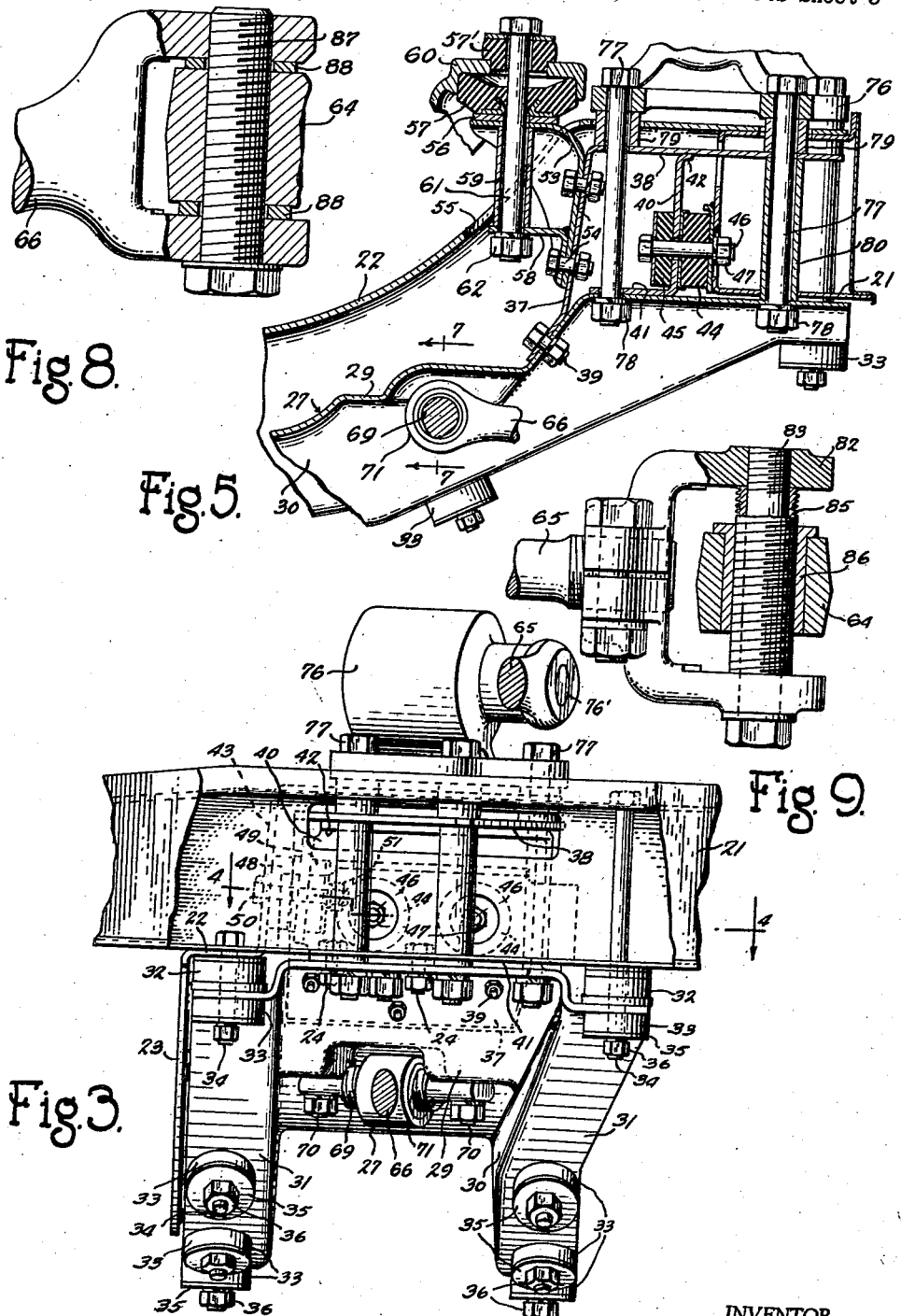
INVENTOR.
Walter R. Griswold
BY
ATTORNEYS Sept. 2, 1941. W. R. GRISWOLD 2,254,282
MOTOR VEHICLE
Filed Nov. 12, 1938 4 Sheets-Sheet 4
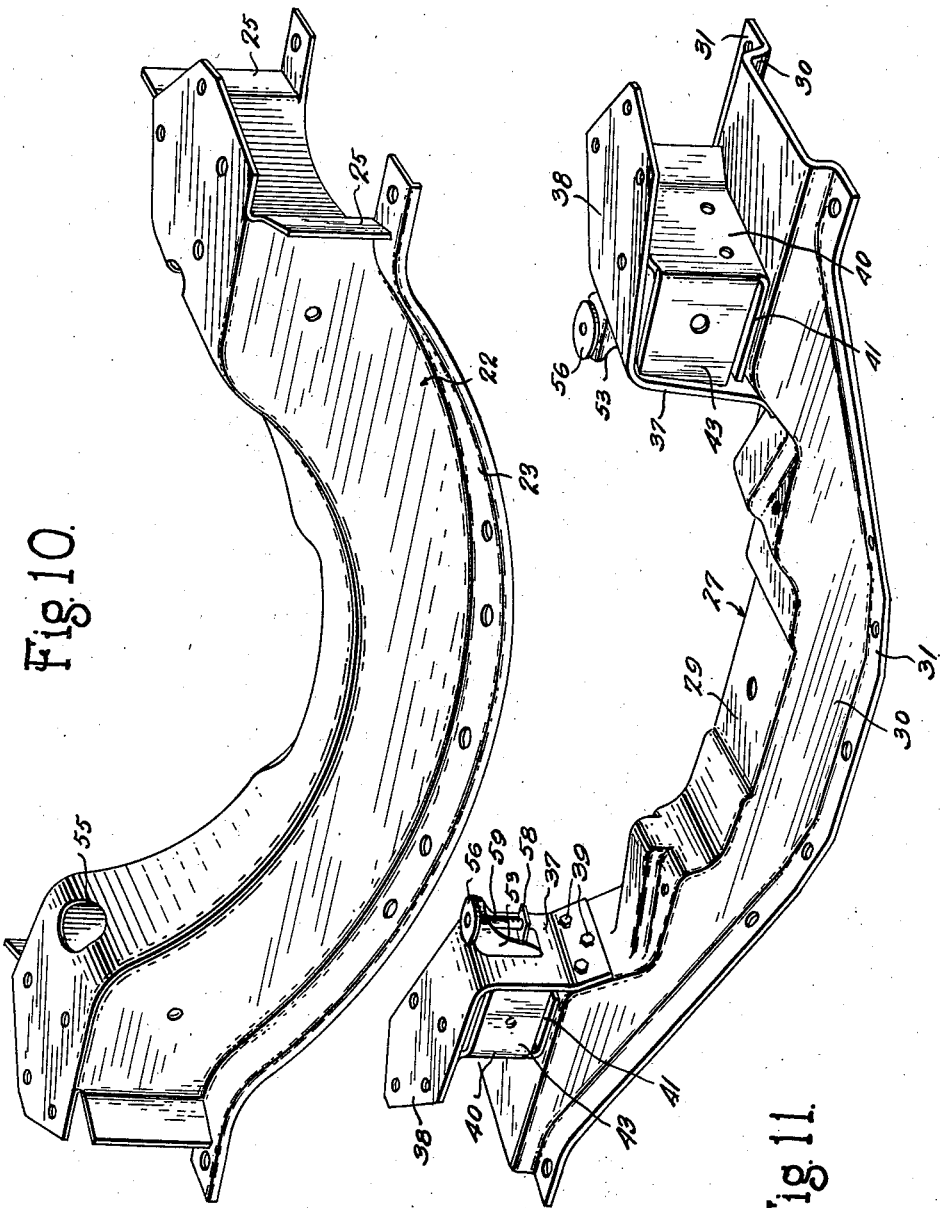
INVENTOR.
Walter R. Griswold
BY
Sibbetts & Hart
ATTORNEYS Patented Sept. 2, 1941

2,254,282

UNITED STATES PATENT OFFICE 2,254,282

MOTOR VEHICLE

Walter R. Griswold, Detroit, Mich., assignor to Packard Motor Car Company, Detroit, Mich., a corporation of Michigan Application November 12, 1938, Serial No. 240,107

11 Claims. (Cl. 180—64)

This invention relates to motor vehicles and more particularly to wheel and engine carrying mechanism.

One of the objects of the invention is to provide vibration damping means between the frame and wheel carrying mechanism of a motor vehicle.

Another object of the invention is to provide a motor vehicle with a mounting carrier for the front wheel suspenion and the engine that is anchored to and entirely insulated from the frame.

A further object of the invention is to provide a carrier for the wheel supporting mechanism of a motor vehicle that is mounted in floating and insulated relation with the frame.

Another object of the invention is to reduce the cost of independent wheel suspensions having vertically spaced parallel links by arranging the connections so that substantially the entire braking torque is taken by the upper link to thus permit a less rugged lower link.

Other objects of the invention will appear from the following description taken in connection with the drawings, which form a part of this specification, and in which:

Fig. 1 is a front elevational view of a motor vehicle chassis incorporating the invention;

Fig. 2 is a fragmentary plan view of the same;

Fig. 3 is a fragmentary elevational view of the same;

Fig. 4 is a sectional view taken on line 4—4 of Fig. 3;

Fig. 5 is a sectional view taken on line 5—5 of Fig. 4;

Fig. 6 is a sectional view taken on line 6—6 of Fig. 1;

Fig. 7 is a sectional view taken on line 7—7 of Fig. 5;

Fig. 8 is a sectional view taken on line 8—8 of Fig. 1;

Fig. 9 is a sectional view taken on line 9—9 of Fig. 1;

Fig. 10 is a perspective view of the front cross member of the frame;

Fig. 11 is a perspective view of the carrier for the engine and wheel support mounts.

Referring to the drawings, it will be observed that the main frame of the motor vehicle includes longitudinally extending side members 20 and 21 connected adjacent their forward ends by a cross member 22, the side members being of box formation and the cross member being of inverted channel formation with outwardly extending horizontal flanges 23 at the open bottom portion. The end portions 25 of the side walls of the cross member are free from the top wall and the horizontal flanges and are bent outwardly permitting the top wall and horizontal flanges to embrace the frame side members, any suitable means being employed to fasten the members permanently in such relation. An engine 26 has its forward end in close proximity to the cross member and the rear portion thereof is mounted on the frame in any conventional manner.

Anchored to the frame cross member is a carrier 27 on which are fixed mountings for the forward end of the engine and for supporting means carrying the front steering wheels 28. The carrier is rigid, being formed preferably of sheet metal, and is generally similar in cross section to the front cross frame member, consisting of an inverted channel having a top wall 29, side walls 30, and flanges 31. The carrier is substantially coextensive with and nested partly in the frame front cross member. In order to insulate the frame from the carrier and to allow the carrier to float a limited extent relative to the frame, a plurality of damping devices are utilized, such devices being preferably formed of rubber. Between the adjacent flanges of the frame cross member and the carrier are arranged rubber rings 32, and aligned with such rings on the underside of the carrier flanges are rubber rings 33. Bolts 34 extend through openings in the cross member and carrier flanges and sets of rubber rings and washers 35, and nuts 36 are associated with the threaded ends of the bolts to anchor the carrier to the frame. The carrier openings for the bolts are of sufficient size to provide adequate clearance to prevent any possibility of the bolts contacting the carrier.

The ends of the carrier are also anchored and insulated to allow a limited floating movement of the carrier in endwise and longitudinal directions relative to the frame. The carrier includes at each end a sheet metal super-structure comprising an angular plate having an upstanding portion 37 and an outwardly extending horizontal portion 38, the portion 37 being secured to the carrier wall 29 by bolts 39. Each end of the carrier includes a supporting structure between the walls 29 and 38 consisting of a vertical longitudinally extending wall 40, a base wall 41 secured to the wall 29 by bolts 24, a top wall 42 welded to wall 38, and a transversely extending wall 43 extending from the front of wall 40. Insulating means in the form of rubber rings 44 space the walls 40 from the wall of the adjacent frame side members and aligned with such rings on the inner face of walls 40 are rubber rings 45. Bolts 46 anchor the walls 40 with the adjacent frame side members and they pass through openings in the walls and the aligned rubber rings and have nuts 47 associated therewith.

Rubber rings 48 space the walls 43 from the front side wall of the frame cross member and aligned with such rings and the front face of walls 43 are rubber rings 49. Anchor bolts 50 extend through openings in the walls 43 and the front wall of the cross member and the aligned rings, and nuts 51 are applied thereto. The openings in walls 40 and 43 through which the bolts pass are of sufficient diameter to provide clearance so that the bolts cannot contact with such walls. The carrier is thus anchored to the frame front cross member and can float a limited extent relative thereto as well as being entirely insulated therefrom. The insulation will, of course, prevent the transfer of vibrations between the frame and the carrier.

The carrier serves to support mountings for the front end of the engine. A bracket 53 is fixed to each of the walls 37 by bolts 54 and such brackets project upwardly through openings 55 formed in the top wall of the frame cross member 22. Washers 56 rest on top of the brackets and cup-shaped metal reinforced rubber members 57 are mounted on the washers. The brackets have arms 58 secured to their legs that extend in spaced parallel relation with the bracket top portions and between the top portions and the arms are arranged spacer bushings 59. Brackets 60 are fixed to opposite sides of the forward end of the engine and are arranged to rest on the rubber mounting members 57. Bolts 61 secure the engine brackets to the mountings on the carrier and they pass through brackets 60, the rubber members 57 and 57' associated on opposite walls of the brackets 60, the tops of brackets 53, the spacers 59, and the bracket arms 58, and are secured in such relation by nuts 62. The engine is thus supported on the carrier in insulated relation therewith and the rubber mounts are such that they permit a limited movement of the forward end of the engine relative to the carrier.

The independent suspension mechanisms for the wheels 28 are also mounted on the carrier. The wheels are rotatably mounted on stub axles 63 and such axles are carried by vertically extending members 64 in a relation such that they can be swung thereon for steering the vehicle. Similar substantially parallel upper and lower link structures support the wheel carrying members 64 and the upper link structures each comprises a single transversely extending link 65. The lower link structures each comprises a transversely extending link 66 and a longitudinally extending strut 67. The forward ends of the struts extend through openings in the links 66 and are secured in such relation by nuts 68. Threaded journal members 69, see Fig. 7, are secured to the underside of the carrier top wall 29 by bolts 70 and the inner ends 71 of the links 66 are screwed onto such threaded members. Brackets 72 are fixed to the underside of the frame side members and rear ends of the struts 67 are carried thereby. Surrounding the struts on each side of the walls of the brackets through which they extend are rubber rings 73, and adjacent each of these rings is a retainer member 74. The extreme ends of the struts are threaded and nuts 75 are screwed thereon to secure the struts and the retainers with the brackets in the relation specified. The inner ends of the upper links 65 are fixed to the shafts 76' of conventional shock absorbers 76, and the outer casings of the shock absorbers are mounted entirely upon the ends of the carrier 27. The shock absorbers are arranged above the side members of the vehicle frame and a plurality of bolts 77 extend through the shock absorber housings, openings in the upper walls of the frame side members and the carrier ends in which relation they are secured by nuts 78. Spacer members 79 extend through the openings in the top walls of the frame side members and rest upon the walls 38 of the carrier super-structures, there being sufficient clearance so that the spacers will not come into contact with the frame side members. Spacers 80 surround some of the bolts for securing the shock absorbers and they extend between the wall 29 of the carrier and the wall 38 of the super-structures at the ends of the carrier. In this manner the shock absorbers are fixed on the ends of the carriers independently of the vehicle frame. It will also be noted that the inner ends of the links 65 are carried entirely upon the carrier and that the rear ends of the struts 67 are carried by the side members of the main frame.

The outer ends of the upper links 65 have adjustable U-shaped bearing ends 82 screwed thereon that carry bolts 83 on which are fixed threaded sleeves 85, and the upper ends of the carrier members 64 are formed with eyes in which are fixed bushings 86 that are threaded internally and screwed upon the threaded sleeves 85. The outer ends of the lower links 66 are bifurcated and support threaded bearing bolts 87 on which the lower ends of the carrier members 64 are screwed. Suitable thrust washers 88 are arranged between the bifurcated ends of the arms 66 and the lower ends of the carrier members. The lower ends of the carrier members 64 terminate in hooked ends 89 on which hang links 90. The outer ends of a transversely extending leaf spring 91 are carried by these links 90. The central portion of the spring lies within the carrier 27 and is fixed thereto by bolts 92 extending through anchor plates 93. The transverse spring and the shock absorbers damp vertical movement of the wheel supporting structures and suitable bumpers 94 and 95 are arranged to engaged with the upper and lower link structures to limit the vertical movement thereof. The upper and lower link structures, being pivotally associated with the wheel carrying members 67 and pivotally connected to the frame and the carrier and to the members 64, can swing vertically in parallel relationship and the wheels will move in desired vertical paths.

The wheels 28 are provided with the conventional brake mechanisms, as shown diagrammatically at 96. When braking torque is applied to the front wheels, the resulting force tends to wind the wheels up in a forward direction and this reaction is transferred to the carrying members 64 resulting in forward movement of their upper ends and rearward movement of the lower ends. The threads of the lower links are made relatively loose with respect to the threads on their journals, whereas the threads on the upper link are made relatively tight with respect to the threads on their journals, and because of this thread arrangement the brake reaction forces will be first taken by the upper links so that only a straight fore and aft movement is imparted by brake reaction to the lower links and their associated struts. It has been found that this result will be obtained when the threaded journals for the upper ends of the members 64 have .001 inch clearance and the threaded journals for the lower ends of the members 64 have .010 inch clearance. As the lower link structures are not required to resist braking torque they can be made relatively light so that their cost is thereby reduced as compared with similar wheel supporting structures in which the lower links must take all or a major portion of the braking torque.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. In a motor vehicle, a chassis frame, a rigid carrier movably secured to the frame, a pair of link wheel suspension means fixed to the carrier, a transversely extending spring fixed centrally to the carrier and at its ends to the link suspension means, and shock absorbers connected with the link suspension means and mounted on said carrier.

2. In a motor vehicle, the combination of a vehicle frame, a floating carrier anchored to the frame, road wheel assemblies supported on said frame and said carrier for up and down movement, a transversely extending leaf spring connected adjacent the outer ends thereof with said wheel assemblies, means connecting said spring to said carrier, and vibration damping means acting between said frame and said carrier to resist floating movement of the latter, said last named means including rubber.

3. In a motor vehicle, a frame, a floating carrier connected to and extending transversely beneath the frame, a hydraulic shock absorber on each side of the vehicle, said shock absorbers each having a housing fixed to the carrier above the frame and a movable piston portion in the housing, and a wheel carrier link on each side of the frame fixed to move with the adjacent movable shock absorber piston portion.

4. In a motor vehicle, a frame, a carrier mounted transversely of the frame in floating relation therewith, and a wheel carrier link on each side of the frame, each link having a transversely extending portion pivoted to the carrier and a longitudinally extending portion pivoted to the adjacent side of the frame.

5. In a motor vehicle, a frame having side members and a transverse member, a carrier coextensive with the frame transverse member and connected in insulated floating relation therewith, a shock absorber at each side of the frame having a housing fixed to the carrier and a restrained movable piston member in the housing, and a pair of superposed wheel carrying links at each side of the frame, the upper link of each pair of links being fixed to the adjacent shock absorber piston member and the lower link of each pair of links having a portion pivoted to the carrier and another portion pivoted to the adjacent side of the frame.

6. In a motor vehicle, the combination of a vehicle frame having an inverted channel cross member at the forward portion with outwardly extending front and rear edge portions, an inverted carrier coextensive with and nested in said cross member, said carrier having outwardly extending front and rear edge portions extending below and parallel with the edge portions of said cross member, resilient insulation means between the out-turned edge portions of said cross member and said carrier, means anchoring said parallel edge portions together but allowing a limited vertical movement thereof relatively, engine mountings fixed on said carrier and projecting through said cross member, and a transversely extending leaf spring lying within and fixed to the central portion of said carrier.

7. In a motor vehicle, the combination of a vehicle frame having an inverted channel cross member at the forward end with outwardly extending front and rear edge portions, an inverted channel carrier coextensive with and nested in said cross member, resilient insulation means damping relative vertical and horizontal movement of said cross member and said carrier, means anchoring the edge portions of the carrier to the edge portions of the cross member, and engine and shock absorber mountings fixed on said carrier and extending through the top wall of said cross member.

8. In a motor vehicle, the combination of a frame having an inverted channel cross member at the forward end, an inverted channel carrier coextensive with and nested in said cross member, means suspending the carrier from the cross member but allowing relative movement thereof, resilient means opposing vertical movement of said cross member and said carrier relatively, adjacent flanges fixed to the end portions of the cross member and the carrier, and resilient connections bonded to said flanges.

9. In a motor vehicle, the combination of a frame having an inverted channel cross member at the forward end thereof, an inverted channel engine carrier coextensive with and nested in said cross member, means suspending said carrier from said cross member but permitting relative movement thereof, resilient insulation means between said cross member and said carrier opposing relative vertical movement thereof, resilient insulation means between the end portions of said cross member and said carrier opposing relative movement thereof transversely and longitudinally of the vehicle.

10. In a motor vehicle, a frame having a transversely extending member, a floating carrier member anchored to and beneath said frame member, resilient insulation means spacing the members, a leaf spring beneath and fixed centrally to said carrier member, and wheel supporting link members connected to the spring ends, the carrier member and the frame.

11. In a motor vehicle, a chassis frame including a transversely extending member, a floating carrier member coextensive with and spaced beneath the frame member, means anchoring the members together, rubber insulation means spacing the members, wheel supporting members connected to the carrier, and engine mounting members fixed to the carrier member and extending upwardly through the transverse frame member.

WALTER R. GRISWOLD.